United States Patent
Weber et al.

(10) Patent No.: US 8,757,881 B2
(45) Date of Patent: Jun. 24, 2014

(54) BEARING PACKAGE FOR A PROGRESSIVE CAVITY PUMP

(75) Inventors: James L Weber, Calgary (CA); Lynn P Tessier, Eckville (CA)

(73) Assignee: Advantage Products Inc.

( * ) Notice: Subject to any disclaimer, the term of this patent is extended or adjusted under 35 U.S.C. 154(b) by 79 days.

(21) Appl. No.: 13/336,506

(22) Filed: Dec. 23, 2011

(65) Prior Publication Data

US 2012/0163743 A1 Jun. 28, 2012

Related U.S. Application Data

(60) Provisional application No. 61/426,875, filed on Dec. 23, 2010.

(51) Int. Cl.
*F16C 17/04* (2006.01)
*E21B 10/22* (2006.01)

(52) U.S. Cl.
USPC .............................................. 384/97; 384/420

(58) Field of Classification Search
USPC ................................ 384/95, 97, 420; 166/105
See application file for complete search history.

(56) References Cited

U.S. PATENT DOCUMENTS

| | | | | | |
|---|---|---|---|---|---|
| 4,410,054 | A | * | 10/1983 | Nagel et al. | 384/95 |
| 4,560,014 | A | * | 12/1985 | Geczy | 175/107 |
| 5,209,294 | A | * | 5/1993 | Weber | 166/105 |
| 5,364,192 | A | * | 11/1994 | Damm et al. | 384/420 |
| 6,338,388 | B1 | * | 1/2002 | Winkler | 166/382 |
| 8,277,124 | B2 | * | 10/2012 | Sexton et al. | 384/92 |
| 2010/0226759 | A1 | * | 9/2010 | Cooley et al. | 384/95 |
| 2011/0150687 | A1 | * | 6/2011 | Ree | 418/48 |

* cited by examiner

*Primary Examiner* — Thomas R Hannon
(74) *Attorney, Agent, or Firm* — Sean W Goodwin; Linda M Thompson (57) ABSTRACT

Bearing assemblies and bearing packages, incorporating said bearing assemblies, utilize opposing polycrystalline diamond compact bearing surfaces which can be immersed in a process fluid such as a wellbore fluid. The bearing assemblies are mounted to support the shaft for both axial and radial loading of the shaft. A static bearing surface is mounted in a static bearing housing. A rotating bearing surface, which opposes the static bearing surface, is mounted in a rotating bearing housing which supports the rotating shaft and co-rotates with the shaft. The rotating bearing surface opposes the static bearing surface and is rotatably supported thereon.

18 Claims, 13 Drawing Sheets

BEARING PACKAGE FOR A PROGRESSIVE CAVITY PUMP

CROSS-REFERENCE TO RELATED APPLICATIONS

This application is a regular application claiming priority of U.S. Provisional Patent application Ser. No. 61/426,875, filed Dec. 23, 2010, the entirety of which is incorporated herein by reference.

FIELD OF THE INVENTION

Embodiments relate to bearings for supporting axial and radial loads on a rotor of a progressive cavity pump and more particularly to a bearing package implementing polycrystalline diamond compact bearings which are immersed in pumped fluids typical of the oil and gas industry.

BACKGROUND OF THE INVENTION

Progressive cavity pumps (PCP) are well known for production of fluids from a wellbore. PCP's comprise a stator and a rotor. The stator is a tubular element having an elastomeric helical passage formed therethrough. The stator is installed in the production tubing which is then lowered into the wellbore. The rotor is a helical element that rotates in the helical passage to pump wellbore fluids uphole through the stator, and through the production string to surface. The rotor is installed in the stator and is suspended from, and rotatably driven, by a sucker rod string which extends downhole through the wellbore from surface.

It is well known that placement of the rotor in the stator is inexact, load causing axial displacement of the rod string and rotor suspended therefrom. One factor includes pumping torque loads on the rod string which vary dramatically during the pumping operation due to differences in gradients of fluids being pumped and the passage of solids through the pump. When the torque increases on the rod string, the consequent torsional deformation of the rod string produces a shortening of the rod string. Conversely, when torque on the rod string decreases, the rod string lengthens. Further, uphole pumping loads impose downhole axial loads on the rod string. The lengthening and shortening of the rod string causes the rotor to move vertically up and down inside the stator which detracts significantly from pump efficiency and can lead to premature wear of the pump.

A further complicating factor in dealing with rotor placement is the fact that the movement of the rod string to rotor connection is eccentric, rotating not only about a rotor axis but also moving in a circular or elliptical path. The eccentric motion of the rotor causes the rod string to move violently laterally within the production string, leading to premature wear of the production string and undesirable stresses on both the production string and the rod string. The lateral motion may also cause the pump stator to move from side to side in the production casing, which is also undesirable and may result in wear of the production string.

Others have attempted to reduce movement of the rotor and to support the rod string from the radial and axial loading imposed thereon. U.S. Pat. No. 5,209,294 to Weber teaches sealed bearings which act between the rod string and the production tubing to transfer loads to the production tubing. Bypass passageways are provided to direct wellbore fluids away from the sealed bearings so as to increase bearing life.

Clearly there is a need for efficient means to support the rod string under axial and radial loading on the rod string and the eccentric motion of the rotor and connected rod string.

SUMMARY OF THE INVENTION

Bearing assemblies, according to embodiments, immerse opposing polycrystalline diamond compact bearing surfaces in a process fluid, such as a wellbore fluid. The bearing assemblies are incorporated, such as into bearing packages for supporting a rod string driving a rotor in a progressing cavity pump. Advantageously, the bearing assemblies do not need to be sealed or isolated from the fluid being pumped.

In one broad aspect, a bearing package is used for a progressive cavity pump in a production tubing string, the pump having a rotor, the rotor rotatable within a stator and along an eccentric path, the rotor being driven by a rod string rotatable in the production tubing for pumping wellbore fluid. The bearing package comprises a tubular housing for connection in the production tubing string above the pump stator. A rotatable rotor shaft is connected in the rod string uphole from the pump rotor and extends through the tubular housing forming a main annulus therebetween. A bearing assembly is mounted in the main annulus and acts between the tubular housing and the rotor shaft for supporting the rotor shaft for rotation therein, under axial and radial loading. The bearing assembly has opposing, polycrystalline diamond compact (PDC) rotating and static bearing surfaces. The wellbore fluid, produced by the pump, flows through the main annulus immersing the rotating and static bearing surfaces therein.

The opposing PDC rotating and static bearing surfaces may be supported on separate rotating and static bearing housings which are mounted in the tubular housing, the rotatable shaft passing through the bearing housings. The bearing surfaces may be formed from a plurality of PDC inserts, each insert having a contact surface. Further, the bearing assembly may be a conical bearing assembly or a spherical bearing assembly.

In another broad aspect, a bearing assembly axially and radially supports a rotatable shaft in a process fluid. The bearing assembly comprises a rotating bearing housing which is operatively connected to the rotatable shaft for supporting rotational load thereon. The rotating bearing housing has a polycrystalline diamond compact (PDC) rotating bearing surface formed thereon and has a bore formed therethrough. A static bearing housing has a PDC static bearing surface formed thereon, the static bearing surface opposing the rotating bearing surface for supporting the rotational load on the rotating bearing surface. The static bearing housing has a bore formed therethrough, The rotatable shaft passes through the bores of the static and rotatable bearing housings and the process fluid passes through the bearing assembly immersing the rotating and static bearing surfaces therein.

DETAILED DESCRIPTION OF THE PREFERRED EMBODIMENTS

Embodiments of the invention are discussed herein in the context of a bearing package and bearing assembly for use in a progressing cavity pump (PCP) however, one of skill in the art would appreciate that embodiments of the invention are applicable, more broadly, for use with any shaft rotating in a process fluid.

PRIOR ART

Figure 1:
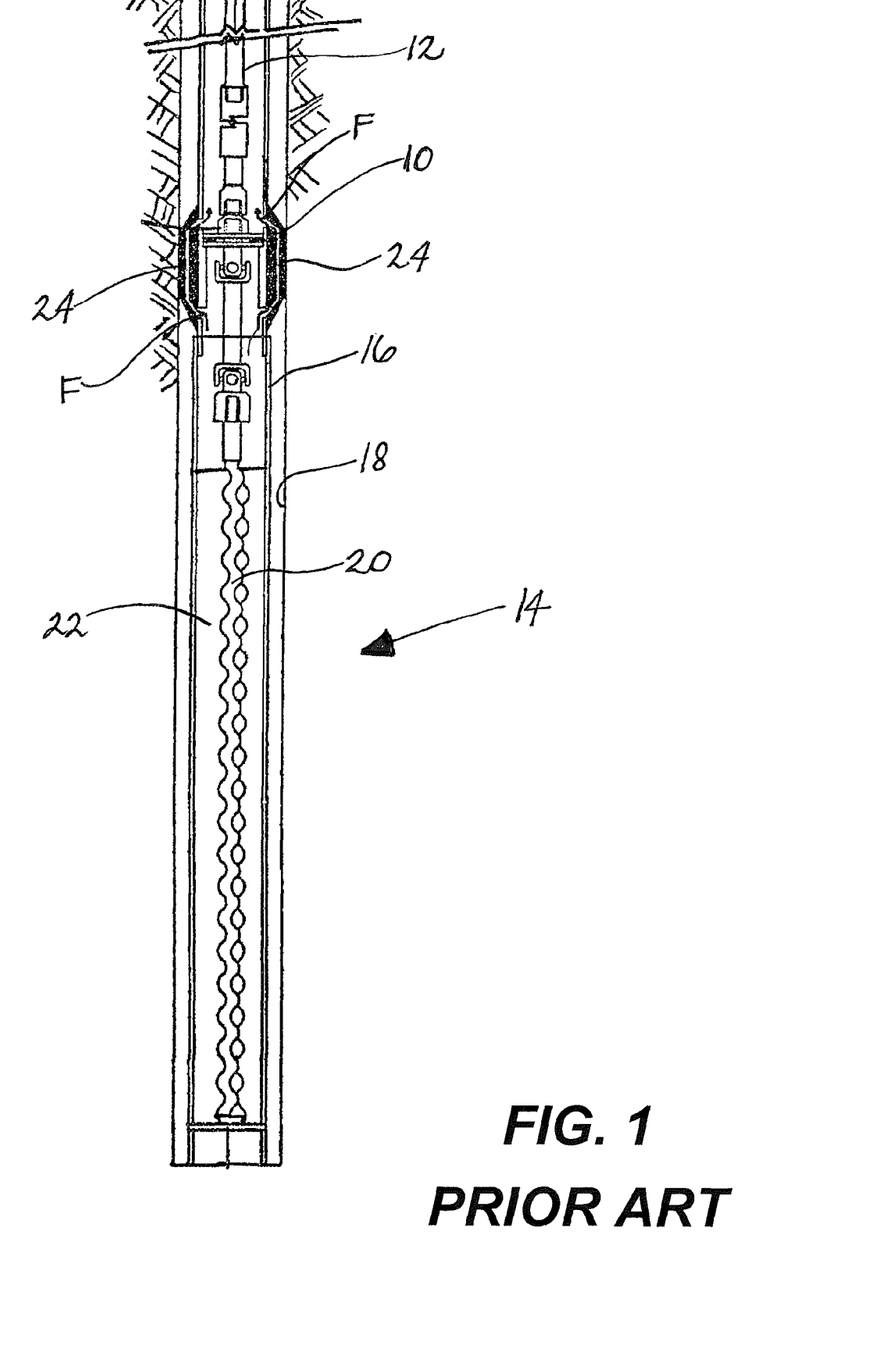
FIG. 1 is a sectional view of a prior art progressive cavity pump and bearing package.

Having reference to FIG. 1, it is known in the prior art, such as in U.S. Pat. No. 5,209,294 to Weber, to provide bearings 10 which support a rod string 12 of a progressing cavity pump (PCP) 14 which is installed in a production tubing string 16 suspended in a wellbore 18. The pump 14 comprises a rotor 20, rotationally driven by the rod string 12, within a stator 22. The stator 22 is fluidly connected to the production tubing 16. Wellbore fluids F are driven uphole within the stator 22 to the production tubing 16 and to surface. The bearings 10 are supported in the production tubing 16 between the rod string 12 and the production tubing 16. Bypass passageways 24 fluidly connect to the production tubing 16, below and above the bearings 10, for bypassing the wellbore fluids F around the bearings 10. Thus, the bearings 10 are isolated from contact with the wellbore fluids F.

EMBODIMENTS OF THE BEARING PACKAGE

Generally a bearing package for a progressive cavity pump is supported between the rotor and the production tubing and in the flow of process or wellbore fluids from the wellbore and comprises a static bearing and a rotating bearing which have bearing surfaces which oppose each other for supporting both radial and axial loading imposed on the rod string. The bearing surfaces can be angled or arcuate. The bearing package transfers the axial and radial load from the rod string to the production tubing. In embodiments, the bearing surfaces comprise polycrystalline diamond compact (PDC) buttons or inserts which are capable of withstanding immersion in the wellbore fluids without significant reduction in bearing life.

In an embodiment, the bearing package is located intermediate the production tubing and the pump and is spaced above the pump by a sufficient length of production tubing and rod string so as to minimize the radial, eccentric motion of the pump rotor. Thus, the bearing package is subjected to only a very small angular motion of the rod string.

Figure 2:
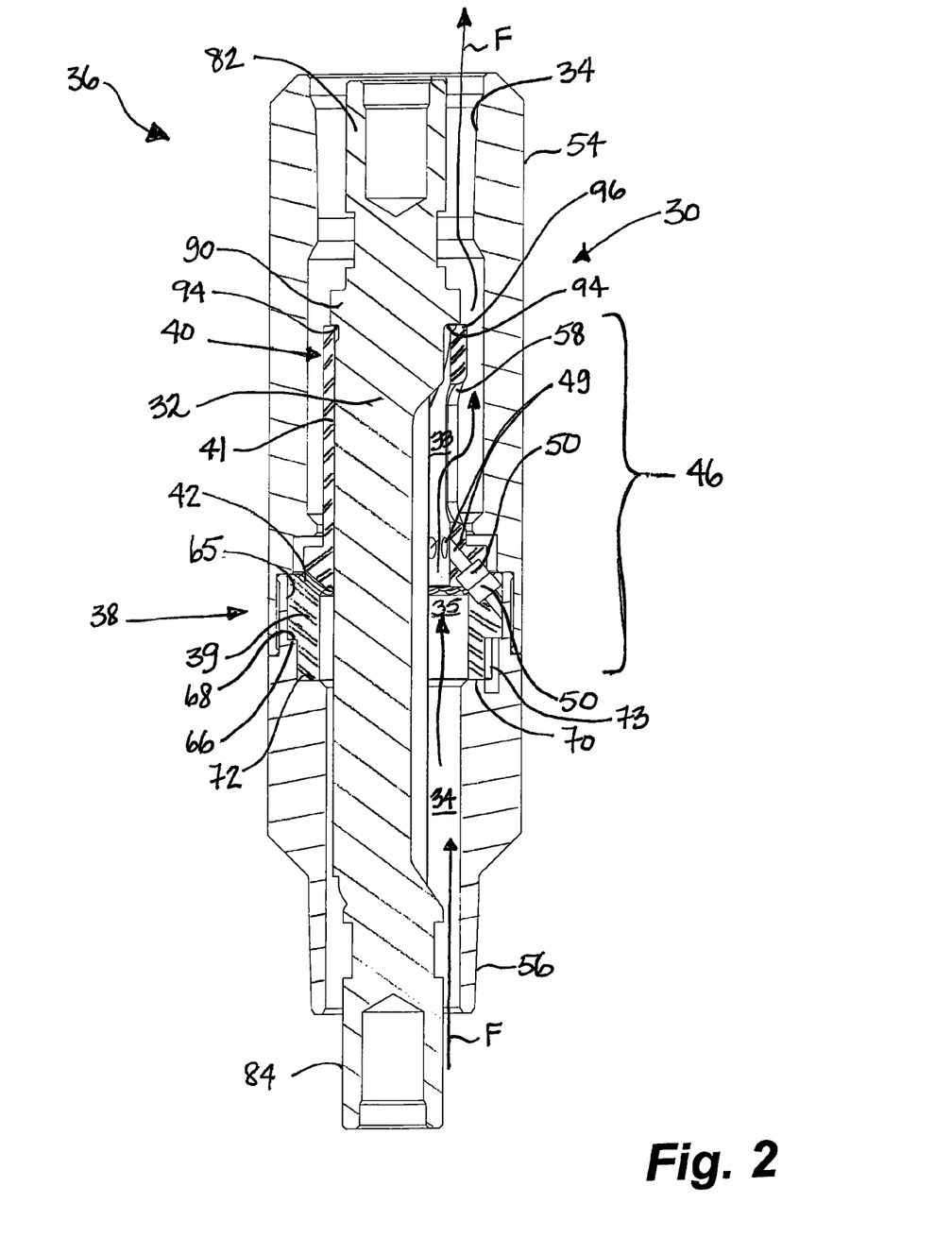
FIG. 2 is a sectional view of a bearing package according to one embodiment, the flow of wellbore fluids therethrough illustrated with arrows.
Figure 3:
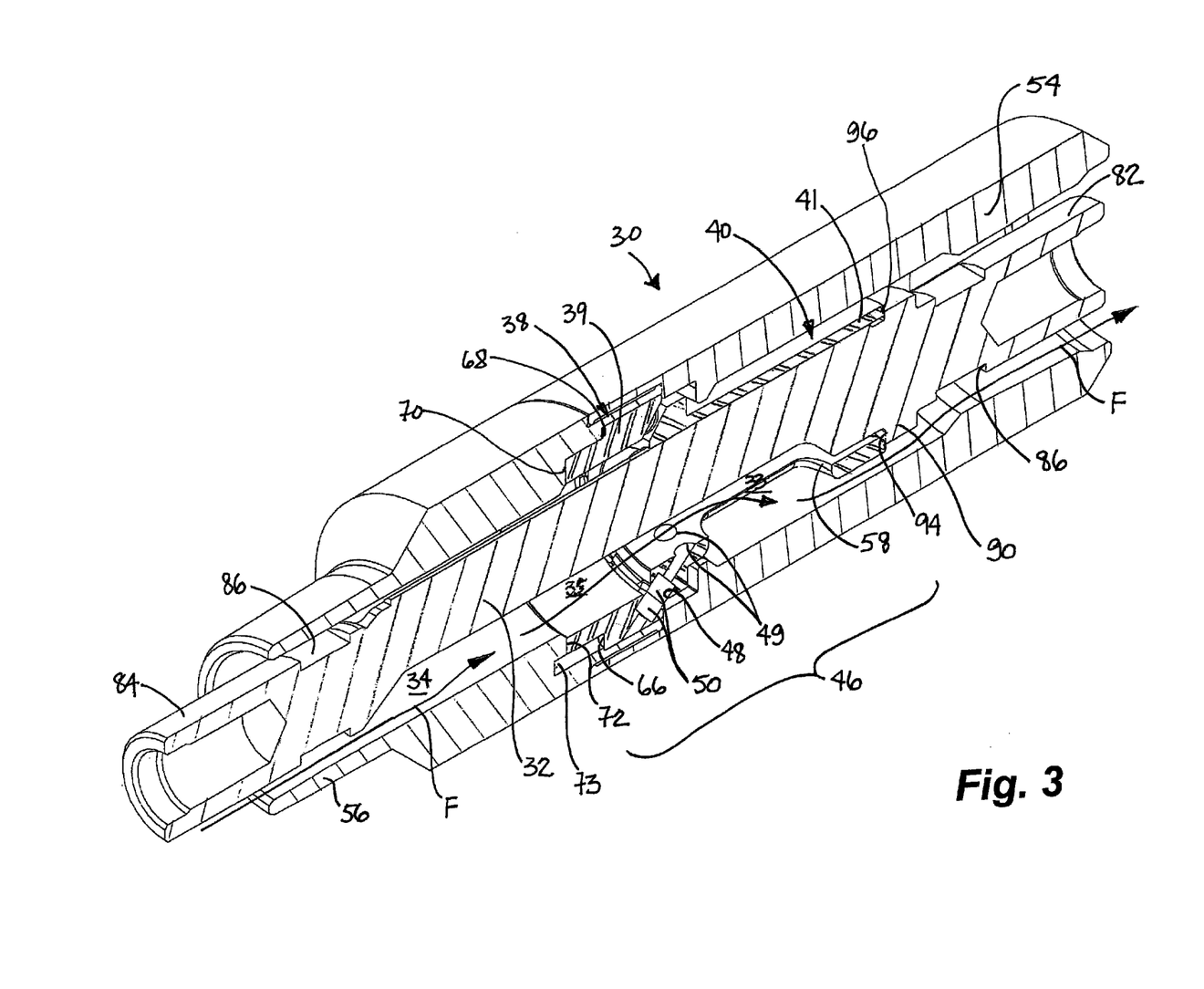
FIG. 3 is a perspective view according to FIG. 2.

In greater detail, and having reference to one embodiment set forth in FIGS. 2 and 3, a bearing package 36 is supported in a tubular housing 30 fluidly connected to production tubing 16 and ultimately to the stator of a progressive cavity pump (PCP), such as that of FIG. 1. Installed, a rotor shaft 32 extends through the tubular housing 30 and connects to a rod string 12 and ultimately to a rotor 20 of the PCP. A main annulus 34 is formed between the tubular housing 30 and the rotor shaft 32 for communicating wellbore fluids F therethrough from the PCP, to the production tubing 16 and to surface. The bearing package 36 is supported in the main annulus 34 and comprises a tubular, static bearing housing 38 supported by the tubular housing 30 and a tubular, rotating bearing housing 40 rotatably supporting the rotor shaft 32 for co-rotation therewith.

The static bearing housing 38, supported in the tubular housing 30, has a bore 62 having the rotor shaft 32 passing therethrough and forming a bearing annulus 35 therebetween. The rotating bearing housing 40 has a bore 60 fit for co-rotation with the rotor shaft 32 and passes through the tubular housing 30. Flow passages 33 are formed along the rotor shaft 32 and the rotating bearing housing 40. Wellbore fluids F, pumped from the main annulus 34, downhole of the bearing package 36, pass uphole through the bearing annulus 35, through the flow passages 33 and to the production tubing 16.

One of skill in the art would appreciate that the flow passages 33 direct the fluid past the rotating bearing housing 40 to the production tubing 16 thereabove and therefore can be formed along the rotor shaft 32, in the rotor shaft 32, in or along the rotating bearing housing 40 or combinations thereof.

In one embodiment where the rotor shaft 32 has a diameter only slightly smaller than the bore 60 of the rotating bearing housing 40, the flow passages 33 are one or more axial flow passages 89 fit to the rotor shaft 32. To pass the fluid F from the radial flow passages 89 to the main annulus 34, uphole from the rotating bearing housing 40, the rotating bearing housing 40 further comprises a plurality of circumferentially spaced fluid ports 58 formed therethrough. The axial flow passages 89 conduct fluid F along the rotor shaft 32 to the fluid ports 58, where the fluids F flow outwardly to the main annulus 34 thereabove.

A bearing assembly 46 is provided between the rotating and static bearing housings 40,38, the bearing assembly 46 being immersed in the fluid F passing therethrough.

Figure 4A:
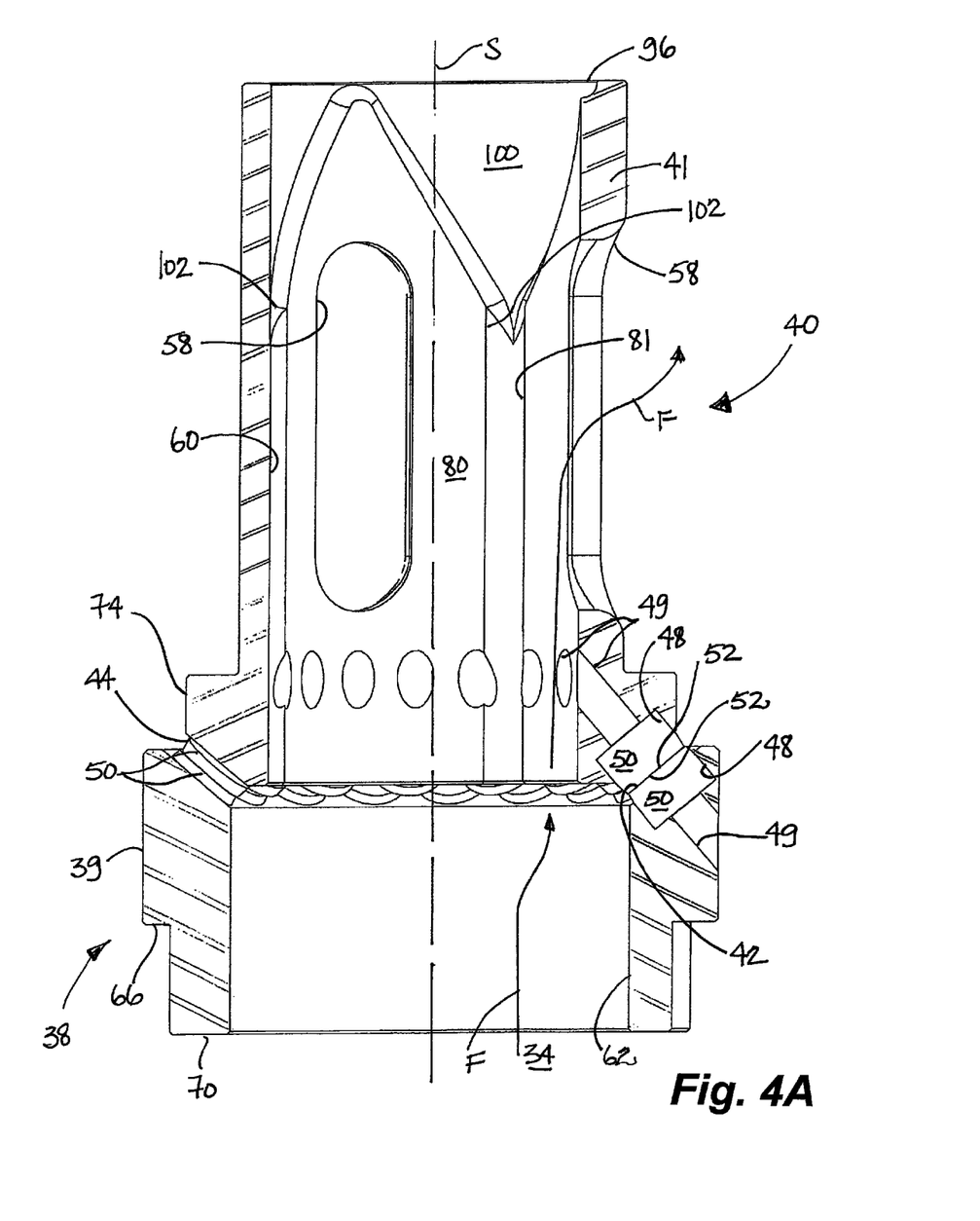
FIG. 4A is a sectional view of a static bearing housing and a rotating bearing housing according to FIG. 2, illustrating a bearing assembly formed therebetween.

Turning to the detailed drawing FIG. 4A, which illustrates the static bearing housing 38 and rotating bearing housing 40 in isolation, the static bearing housing 38 comprises a static bearing surface 42 formed thereon. Similarly, the rotating bearing housing 40 has a rotating bearing surface 44 formed thereon. The static and rotating bearing surfaces 42,44 oppose one another and form the bearing assembly 46 for supporting the rotor shaft 32. The bearing assembly 46 forms face-to-face angular-contact bearings for support of combined radial and thrust loads, depending on the contact-angle magnitude. The bearing assembly 46 minimizes axial movement and deflection of the rotor shaft 32 and supports axial load by transferring load at the rotor shaft 32 to the rotating bearing housing 40, the bearing assembly 46, the static bearing housing 38 and the tubular housing 30.

A plurality of polycrystalline diamond compact (PDC) buttons or inserts 50 are mounted in each of the static bearing housing 38 and the rotating bearing housing 40 for forming the static and rotating bearing surfaces 42, 44. In embodiments, the PDC inserts 50 are mounted in the bearing surfaces 42,44, such as in a circular array about an axis S of the tubular housing 30. Each of the PDC inserts 50 is a generally cylindrical insert having a substantially circular contact surface 52, when viewed in plan.

Figure 4B:
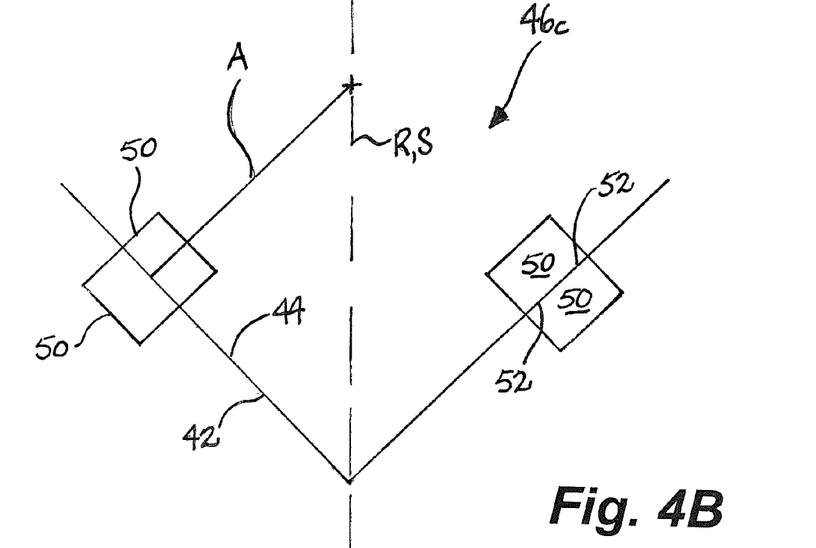
FIG. 4B is a fanciful illustration of the interface of opposing angled bearing surfaces of FIG. 4A arranged in a conical bearing assembly.

As shown in embodiments of FIG. 4B, the angular-contact of the opposing bearing surfaces 42,44 can be arranged about an outside and an inside surface of a conical surface of a right circular cone, forming a conical bearing assembly 46c. In another embodiment shown in FIG. 4C, the angular-contact of the opposing static and rotating bearing surfaces 42, 44 can be arranged about an outside and an inside surface of a spherical surface, forming a spherical bearing assembly 46s therebetween. A scribe axis A, perpendicular to the bearing surfaces 42,44, passes through the axis R of the rotor shaft 32.

The conical bearing assembly 46c restrains axial deviation of the rotor shaft 32. Contact surface 52 of the plurality of PDC inserts 50 on the rotating bearing surface 44 may be profiled, such as being ground to a cylindrical convex surface, perpendicular to the scribe axis A, to avoid lip-to-lip contact with PDC inserts 50 on the opposing, static bearing surface 42. Over time, the contact surfaces 52 of the opposing PDC inserts 50 on the static bearing surface 42 may wear to conform to the profiled contact surfaces 52 on the rotating bearing surface 44.

Figure 4C:
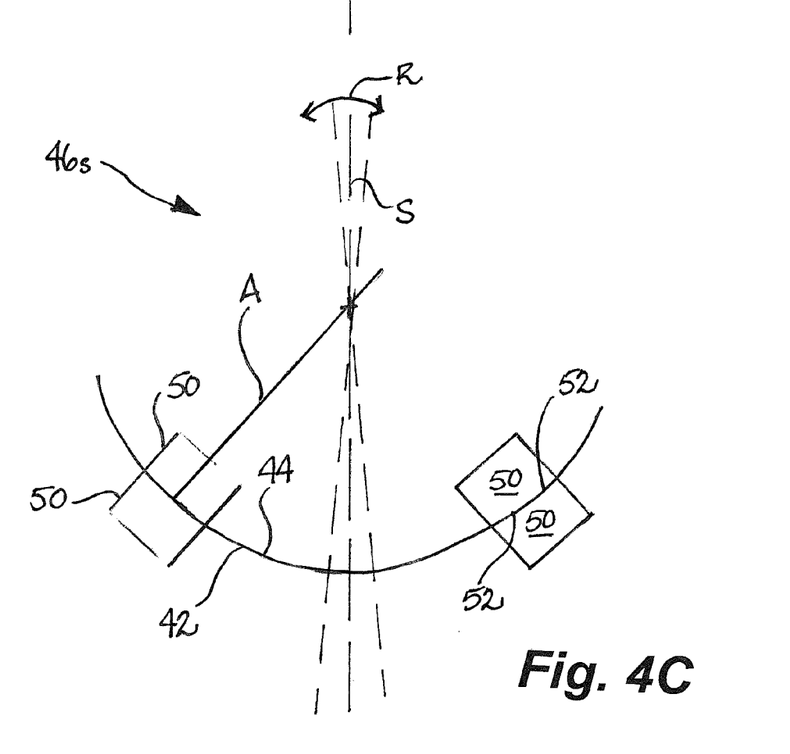
FIG. 4C is a fanciful illustration of the interface of opposing angled bearing surfaces of FIG. 4A arranged in a spherical bearing assembly.

With reference to FIG. 4C, the spherical bearing assembly 46s option is available to better accommodate eccentric motion of the pump rotor 20 in the pump stator 22 which may cause a slight tilt or misalignment of an axis R of the rotor shaft 32, relative to the axis S of the tubular housing 30. The rotating bearing housing 40 can pendulum slightly about the scribe axis, rotor axis A,R intersection. Spherical profiling of the contact surfaces 52 of the PDC inserts 50 on both the rotating bearing surface 44 and the static bearing surface 42 acts to avoid insert lip-to-lip contact as the PDC inserts 50 on the rotating bearing surface 44 rotate and engage the PDC inserts 50 on the static bearing surface 42.

Figure 6:
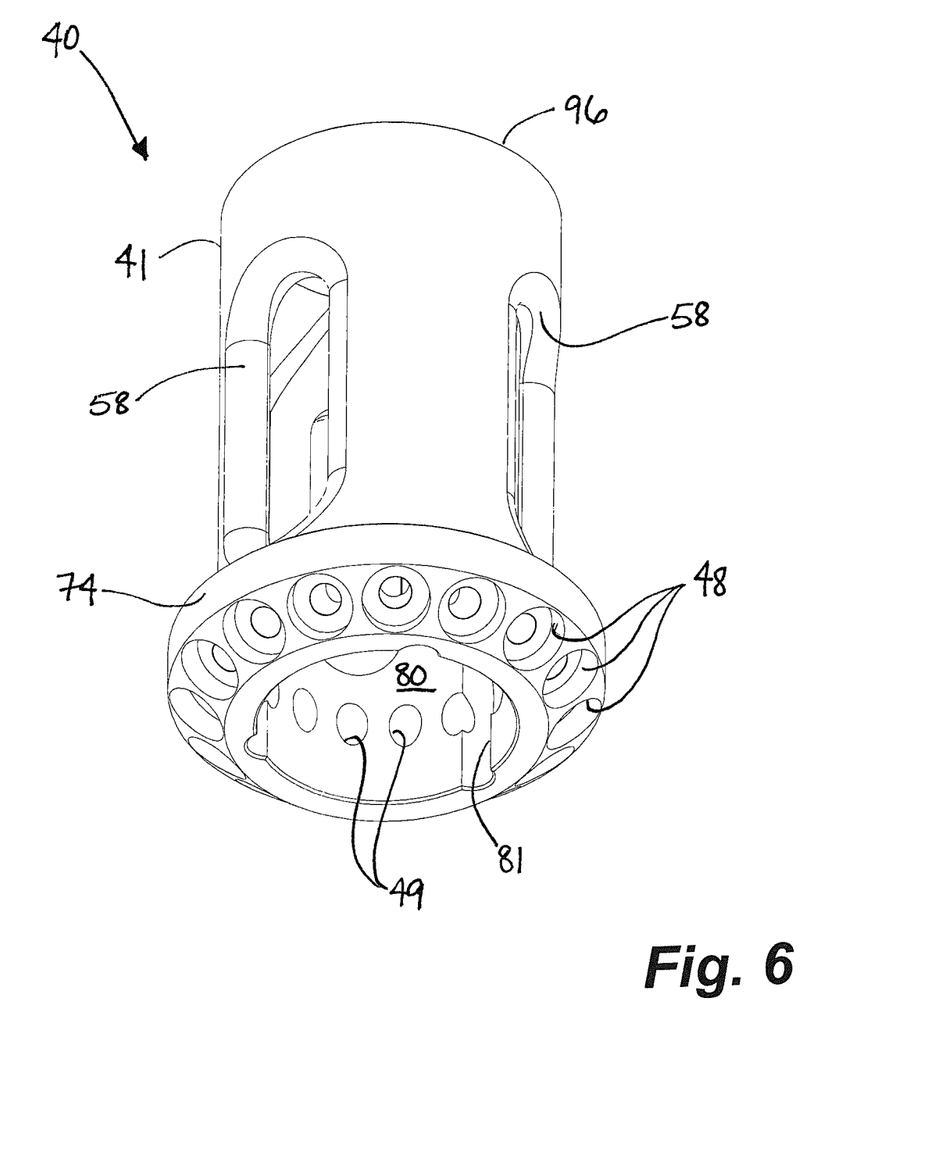
FIG. 6 is a perspective view of the rotating bearing housing according to FIG. 4A, the plurality of PDC buttons being removed for clarity.

Best shown in FIGS. 4A and 6, the plurality of PDC inserts 50 may be installed or affixed to the bearing surfaces 42, 44, such as by being press fit into bores 48 formed therein. Pilot holes 49 extend from the bores 48 through the static bearing housing 38 and the rotating bearing housing to permit air to be expelled therefrom as the PDC inserts 50 are pressed into the bores 48. Alternatively, the PDC inserts 50 can be affixed in the bores 48 by brazing or use of adhesives, as is understood by those of skill in the art.

Figure 5:
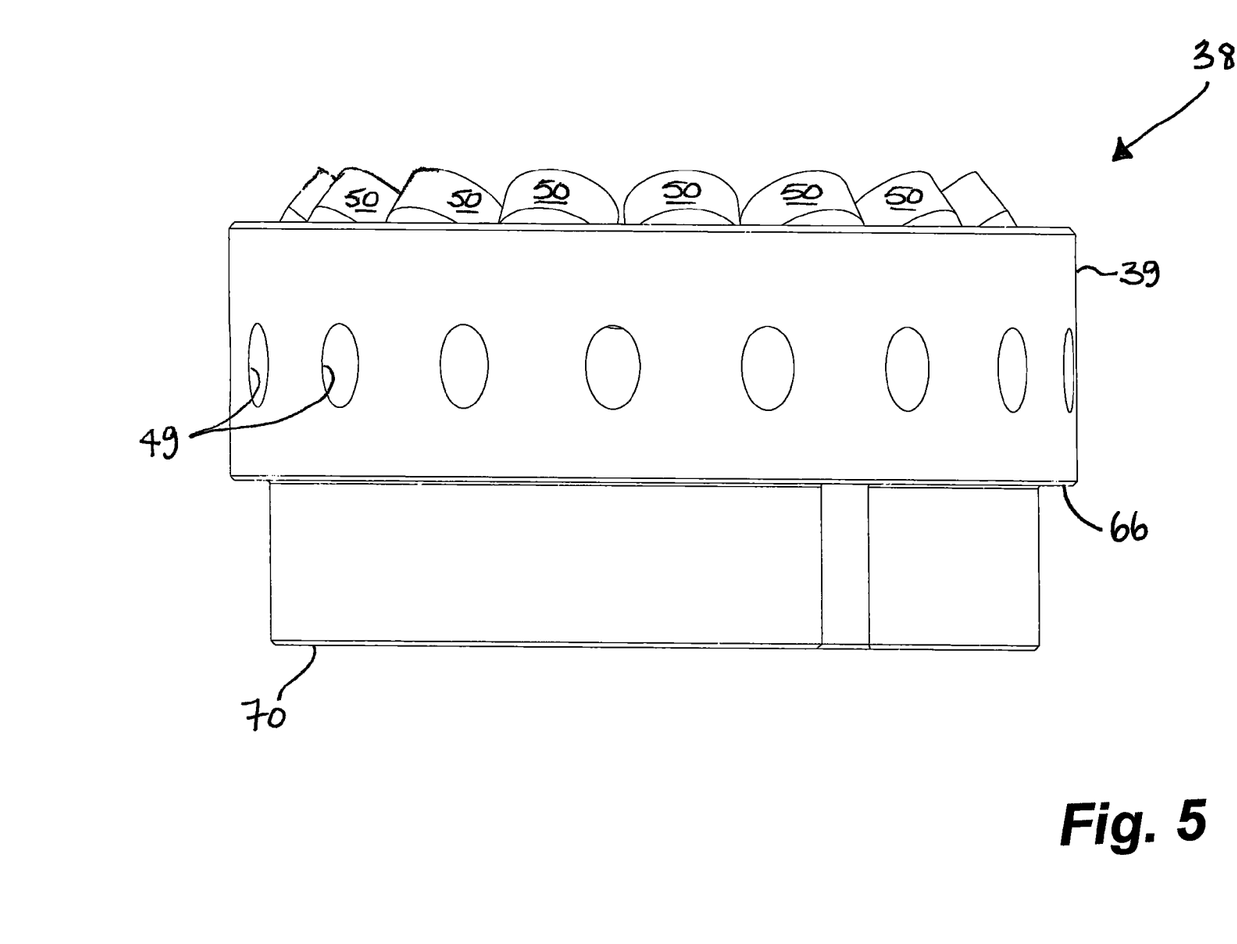
FIG. 5 is a side view of the static bearing housing according to FIG. 4A, shown separated from the tubular housing.

Having reference to FIGS. 2, 4A and 5, the static bearing housing 38 is axially supported in the tubular housing 30. The static bearing housing 38 comprises a tubular sleeve 39 having a radially, outwardly extending annular shoulder 66. The tubular housing 30 has an annular recess 65, having a radially inwardly extending annular shoulder 68 formed therein for receiving shoulder 66 of the static bearing housing 38. The static bearing surface 42 is a circumferentially extending surface which faces radially inwardly and upwardly, formed at an uphole end of the static bearing housing 38. The plurality of insert bores 48 for receiving the PDC inserts 50, are circumferentially spaced about the static bearing surface 42. The insert bores 48 and pilot holes 49 extend through the bearing housing 38 along the scribe axis A.

Further, a downhole end 70 of the static bearing housing 38 can engage a second, radially inwardly extending shoulder 72 formed on the tubular housing 30. Thus, the static bearing housing 38 is supported axially within the tubular housing 30. Further, one or more pins 73 are located between the static bearing housing 38 and tubular housing 30 to prevent rotation of the static bearing housing 38 therein.

Figure 7:
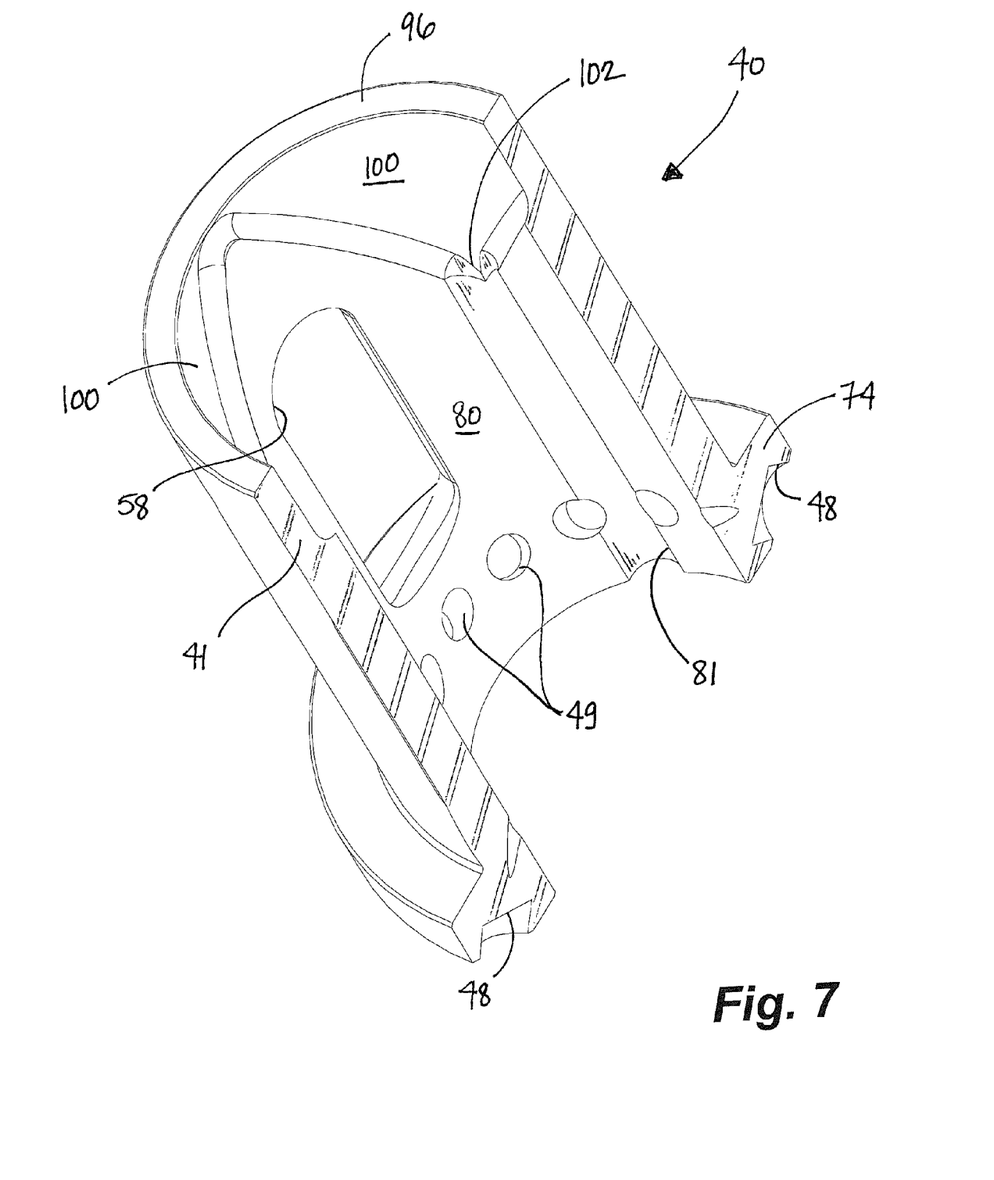
FIG. 7 is a cross-sectional, perspective view of the rotating bearing housing of FIG. 6.
Figure 8:
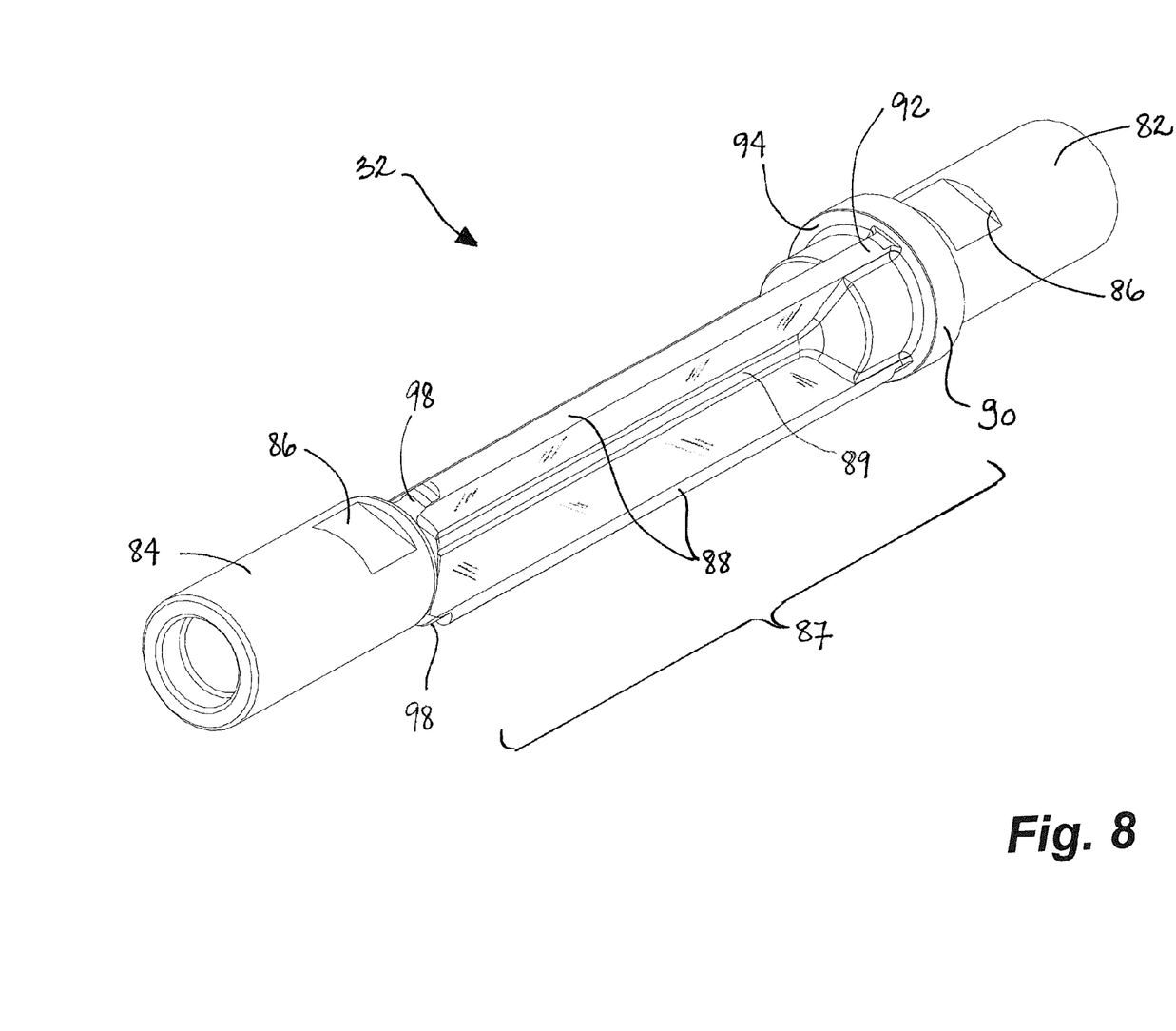
FIG. 8 is a perspective view of a rotor shaft according to FIG. 2.
Figure 9:
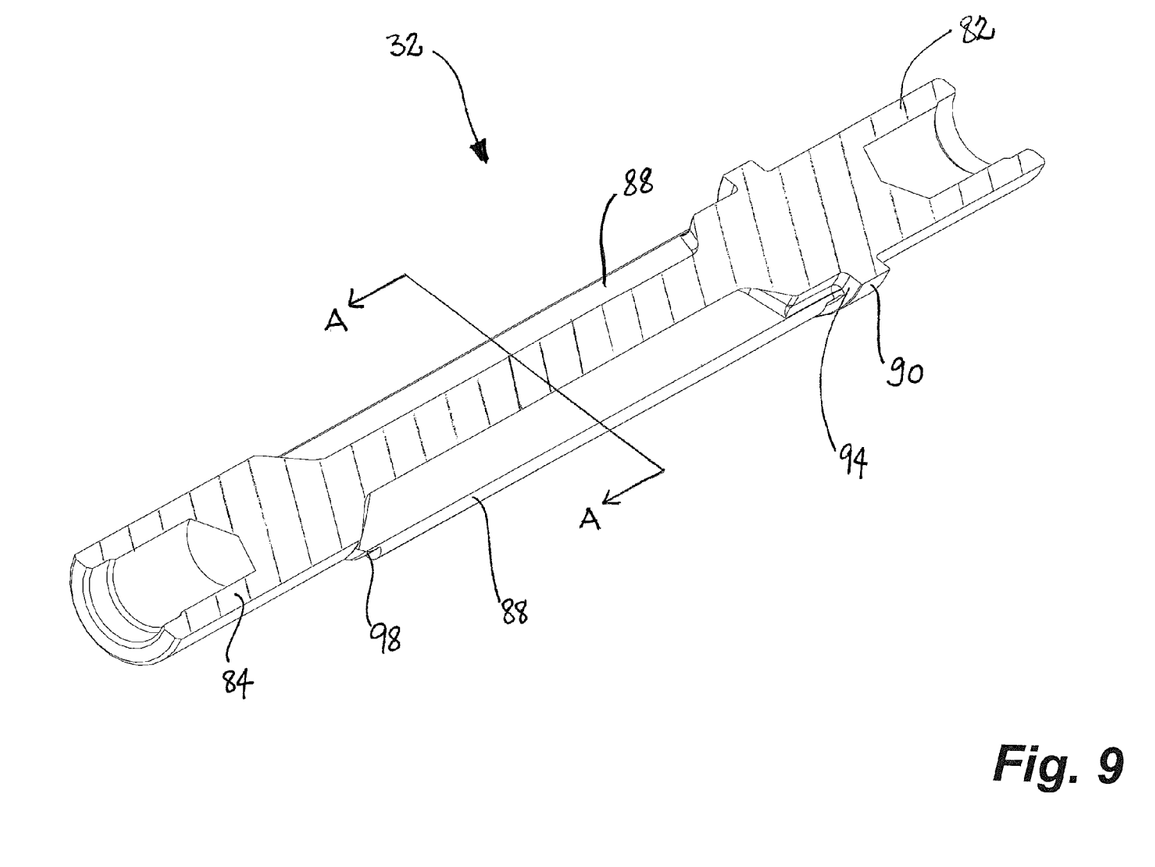
FIG. 9 is a cross-sectional view of the rotor of FIG. 8.
Figure 10:
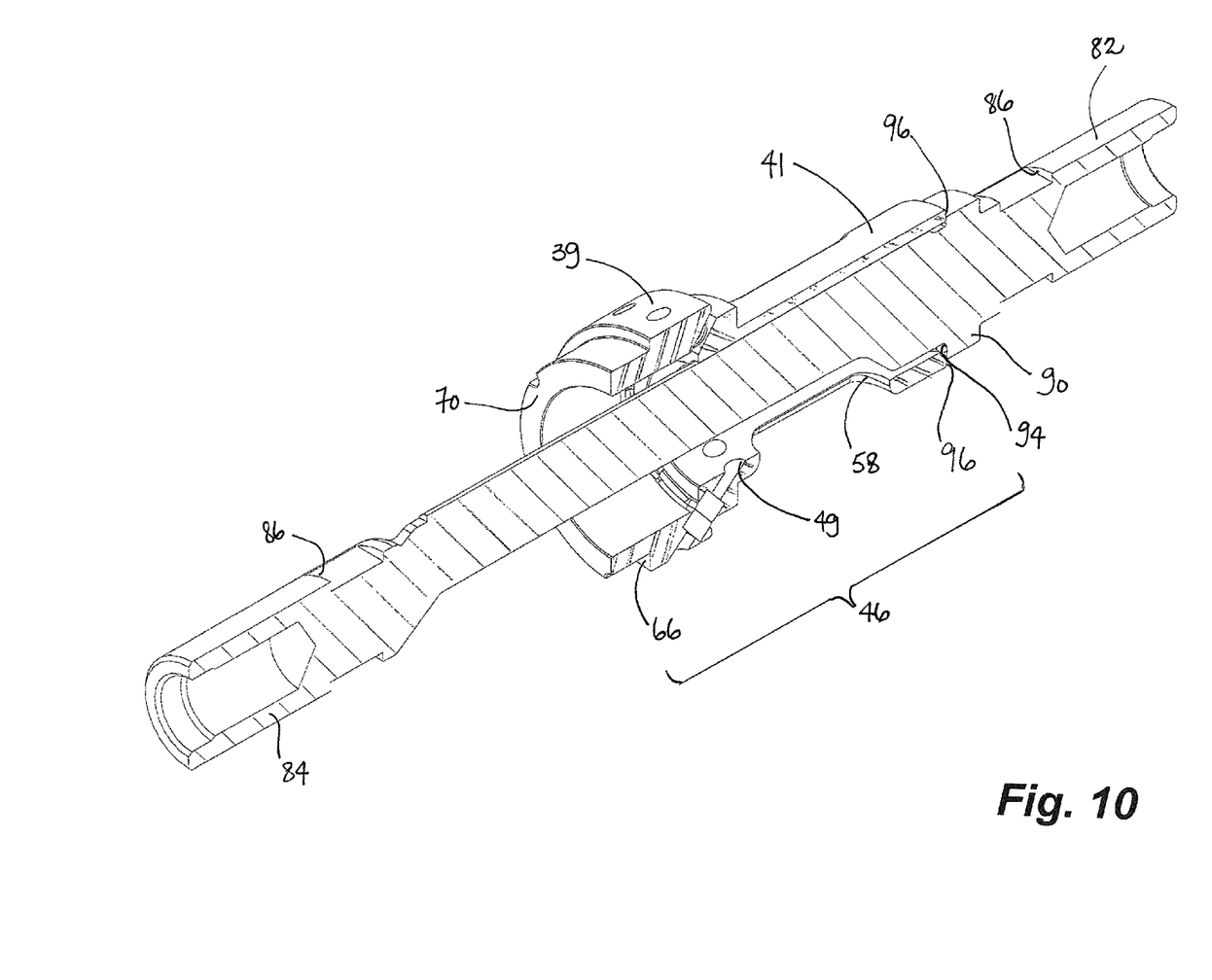
FIG. 10 is a cross-sectional and perspective view of the rotor shaft, the rotating bearing housing installed thereon, both of which are axially aligned with the static bearing housing.
Figure 11:
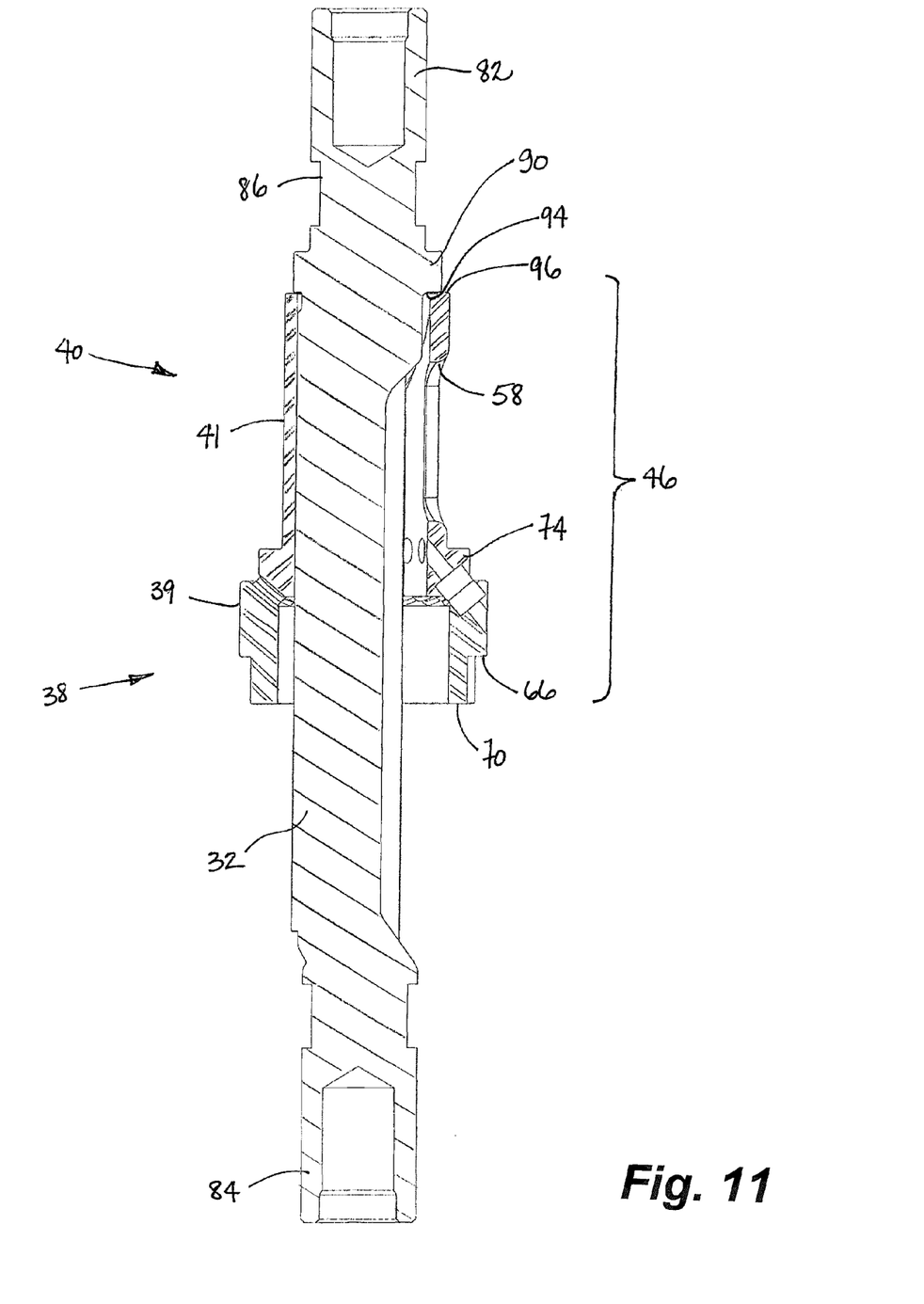
FIG. 11 is a cross-sectional view of the rotor shaft, rotating bearing housing and static bearing housing rotor of FIG. 10.

Having reference to FIGS. 4A, 6 and 7, the rotating bearing housing 40 is a tubular sleeve 41 comprising an uphole end 96 for engaging an annular collar 90 about the rotor shaft 32. A downhole end 74 supports the rotating bearing surface 44, formed thereon, which faces radially outwardly and downwardly. The plurality of insert bores 48 receive the PDC inserts 50 and are circumferentially spaced about the rotating bearing surface 44. The insert bores 48 and pilot holes 49 extend radially outwardly and downwardly from the flow passages 33 through the downhole end 74.

As shown in FIGS. 8 to 11, the rotor shaft 32 comprises an uphole end 82 for connection to the rod string 12 and a downhole end 84 for connection to the pump rotor 20. Wrench slots 86 can be provided at both ends 82, 84 for assisting with threaded connection to the rod string 12 and the rotor 20, respectively. The length of the rotor shaft 32 is such that it extends about an axial length of the tubular housing 30 when extending therethrough. A midsection 87 of the rotor shaft 32 is formed with one or more of the axial flow passages 89, three shown. Between the flow passages 89 are one or more radially protruding, circumferentially spaced, axially extending splines 88. The splines 88 strengthen the rotor shaft 32, provide torsional rigidity thereto and, in cooperation with corresponding keyways 81 in the rotating bearing housing 40, ensure co-rotation of the rotor shaft 32 and housing 40.

The annular collar 90 extends radially and outwardly about the uphole end 82 of the rotor shaft 32, between the wrench slots 86 and an upper end 92 of the splines 88. A downhole facing shoulder 94 of the collar 90 engages the uphole end 96 of the rotating bearing housing 40. The rotor shaft 32 is therefore prevented from downhole axial movement relative to the rotating bearing housing 40.

Figure 12:
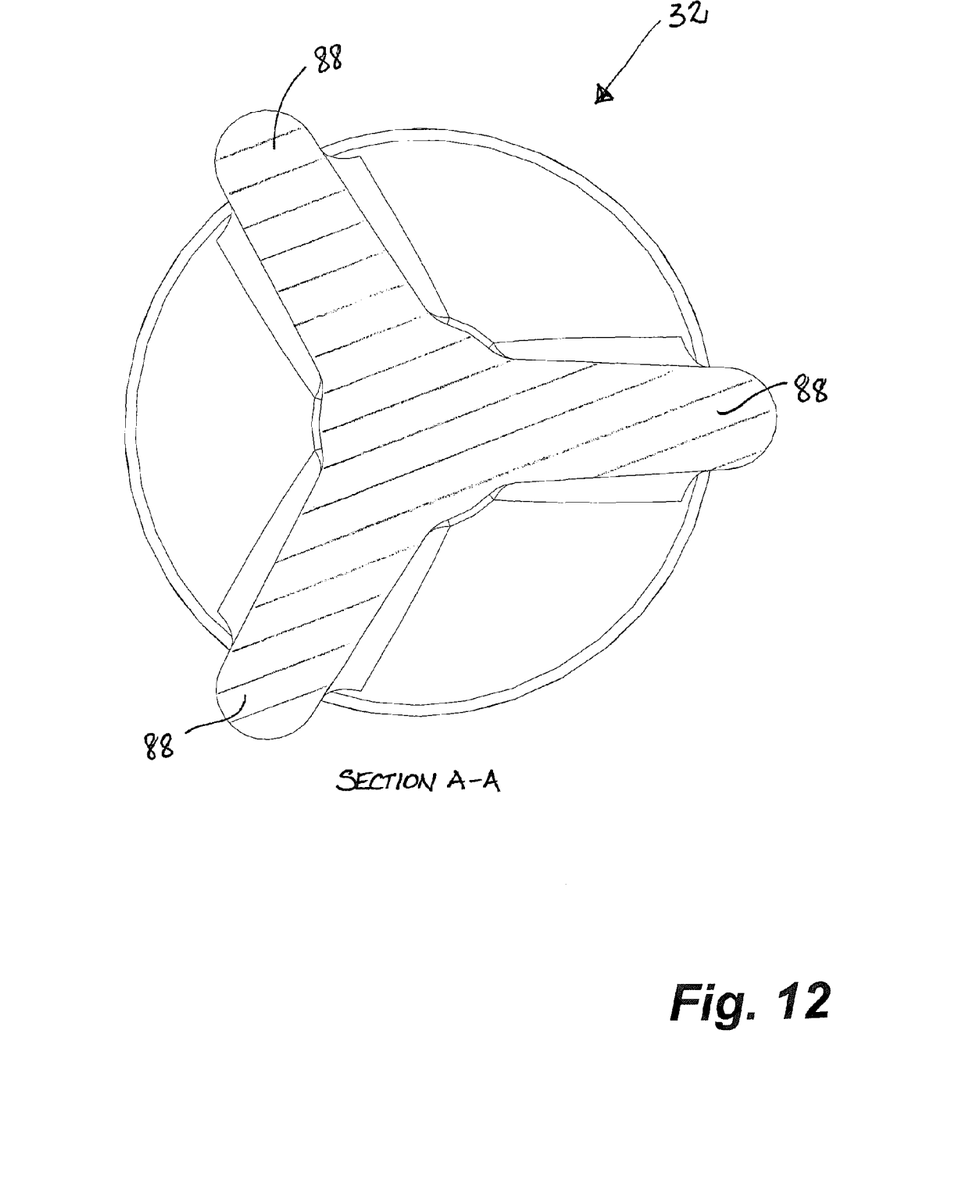
FIG. 12 is a cross-section view of the rotor shaft along section lines A-A, according to FIG. 9.

Best seen in FIG. 12, the splines 88 protrude radially from the rotor shaft 32. Further, best seen in FIGS. 4A and 7, the uphole end 96 of the rotating bearing housing 40 has an inner surface 80 which is profiled with the keyways 81, being one or more circumferentially spaced, axially extending grooves therein, for engaging the one or more splines 88 for co-rotation of the rotating bearing housing 40 with the rotor shaft 32. Further, the uphole end 96 is fit with circumferential-aligning profiles or V-shaped guide passages 100 which receive a leading edge of the splines 88 and rotationally align the rotating bearing housing 40 to urge the splines 88 into the keyways 81. A downhole end 98 of the splines 88 is generally rounded. Each V-shaped guide passage 100 receives the downhole end 98 of its respective spline 88, guides the spline 88 from the uphole end 96 of the rotating bearing housing 40 to terminate at an apex or uphole end 102 of one of the axially extending keyways 81.

Thus, the rotating bearing housing 40 is rotationally engaged with the rotor shaft 32 for co-rotation therewith. The rotor shaft 32 has an overall outer diameter fit to the bore 60 of the rotating bearing housing 40.

One of skill in the art would understand that the splines 88 could be reversed to be formed on the rotating bearing housing 40 for engaging the rotor shaft 32, the flow passages 33 being formed along the rotating bearing housing 40.

In embodiments, as seen in FIGS. 2 and 3, the tubular housing 30 comprises an uphole portion 54 and a downhole portion 56 joined at about the static bearing housing 38. The two-part construction facilitates installation of the static and rotating bearing housings 38, 40 therein. The uphole portion 54 has a box end and the downhole portion 56 has a pin end to facilitate connection between the production tubing 16 thereabove and the PCP. During assembly of the tubular housing 30, the static bearing housing 38 is fit to the downhole portion 56 of the tubular housing 30, and the rotating bearing housing 40 is placed with the opposing bearing surfaces 42,44 facing. The downhole end 74 of the rotating bearing housing 40 is such that, once the uphole and downhole portions 54, 56 of the tubular housing 30 are assembled, the rotating bearing housing 40 cannot be extracted.

In Operation

During assembly, the tubular housing 30 is fit with the rotating bearing housing 30 and the static bearing housing 38, the outwardly extending, annular shoulder 66 of the static bearing housing 38 engaging the tubular housing's inwardly extending annular shoulder 68. The pump stator 22, tubular housing 30, and production string 16 are assembled and located downhole.

Once the production string 16 is in position, the rotor shaft 32 is installed intermediate the rod string 12 and ultimately to the pump rotor 20. The rod string 12 is then lowered downhole into the production string 16. The pump rotor 20 passes through the tubular housing 30 enroute to the pump stator 22. In passing through the tubular housing 30, the pump rotor 20 passes through the rotating bearing housing 40 and static bearing housing 38. The rotor shaft 32 engages the rotating bearing housing 40. The rounded downhole ends 98 of the splines 88 engage the guide passages 100, aligning the splines 88 with the axially extending grooves 81. With the splines 88 and grooves 81 engaged, the rotor shaft 32 can be lowered until the shaft collar 90 engages the uphole end 96 of the rotating bearing housing 40, locating the pump rotor 20 within the pump stator 22.

As shown in FIGS. 2 and 3, as the PCP 14 creates fluid lift, wellbore fluids F are pumped uphole into the main annulus 34, through the bearing annulus 35, through the flow passages 33, such as the flow passages 89 formed axially on the rotor shaft 32, and exits from the fluid ports 58 in the rotating bearing housing 40 to the main annulus 34, production tubing 16 and surface thereabove. The bearing surfaces 42,44 of the bearing assembly 46 are immersed in the flowing wellbore fluid F.

In the event that the pump rotor 20 needs to be pulled from the pump stator 22, the rod string 12 is simply lifted. The rotor shaft 32 and pump rotor 20, connected thereto, are readily lifted out of the rotating bearing housing 40 and tubular housing 30.

The embodiments of the invention in which an exclusive property or privilege is claimed are defined as follows:

1. A bearing package for a progressive cavity pump in a production tubing string, the pump having a rotor, the rotor rotatable within a stator and along an eccentric path, the rotor being driven by a rod string rotatable in the production tubing for pumping wellbore fluid, the bearing package comprising:
    a tubular housing for connection in the production tubing string and spaced above the pump stator;
    a rotatable rotor shaft for connection within the rod string uphole from the pump rotor, the rotatable shaft extending through the tubular housing forming a main annulus therebetween; and
    a bearing assembly mounted in the main annulus and acting between the tubular housing and the rotor shaft for supporting the rotor shaft for rotation therein, under axial and radial loading, the bearing assembly having opposing polycrystalline diamond compact (PDC) rotating and static bearing surfaces;
    a static bearing housing axially supported by the tubular housing, the static bearing housing supporting the static bearing surface thereon; and
    a rotating bearing housing in the main annulus, the rotating bearing housing being operatively connected to the rotatable rotor shaft for co-rotation therewith and for supporting the rotor shaft, the rotating bearing housing supporting the rotating bearing surface thereon, the rotating bearing surface opposing the static bearing surface;
    a bearing annulus formed between the rotor shaft and the static bearing housing;
    flow passages formed along the rotor shaft and the rotating bearing housing; and
    a plurality of fluid ports formed in the rotatable bearing housing, wherein
    the wellbore fluid pumped to the main annulus below the static bearing housing passes through the bearing annulus to the flow passages and through the plurality of fluid ports to the main annulus, and the production tubing, uphole therefrom, and immersing the rotating and static bearing surfaces in the wellbore fluid.

2. The bearing package of claim 1 wherein the rotating and static bearing surfaces further comprise:
    a plurality of polycrystalline diamond compact (PDC) inserts mounted therein.

3. The bearing package of claim 1, wherein the bearing assembly is a conical bearing assembly, angular-contact of the opposing rotating and static bearing surfaces being arranged circumferentially about an outside and an inside surface of a conical surface of a right circular cone.

4. The bearing package of claim 3 wherein a contact surface of each of the plurality of PDC inserts on the rotating bearing surface is profiled to avoid lip-to-lip contact with the opposing PDC inserts on the static bearing surface.

5. The bearing package of claim 1, wherein the bearing assembly is a spherical bearing assembly, angular-contact of the opposing rotating and static bearing surfaces being arranged circumferentially about an outside and an inside surface of a spherical surface.

6. The bearing package of claim 5 wherein a contact surface of each of the plurality of PDC inserts on the rotating bearing surface and the static bearing surface is profiled to avoid lip-to-lip contact therebetween.

7. The bearing package of claim 1 wherein the rotatable rotor shaft comprises
    an uphole end having a radially extending annular collar thereabout for engaging the uphole end of the rotating bearing housing;
    a downhole end;
    a midsection narrowed relative to the uphole and downhole ends; and
    one or more radially protruding, circumferential spaced, axial splines formed thereon, wherein
    the flow passages are formed between the one or more spines.

8. The bearing package of claim 7 wherein the rotating bearing housing further comprises:
    a profiled inner surface having one or more circumferentially spaced, axially extending keyways formed therein for axially engaging the one or more radially protruding circumferential spaced axial splines formed thereon for co-rotation of the rotating bearing housing with the rotor shaft.

9. The bearing package of claim 8 wherein the profiled inner surface further comprises an uphole end having circumferential-aligning profiles therein to receive a leading edge of the one or more splines for rotationally aligning the rotating bearing housing for urging the one or more splines into the one or more keyways.

10. A bearing assembly for axially and radially supporting a rotatable shaft in a process fluid, the bearing assembly comprising:
   a rotating bearing housing operatively connected to the rotatable shaft for supporting rotational load thereon, the rotating bearing housing having a polycrystalline diamond compact (PDC) rotating bearing surface formed thereon and having a bore formed therethrough;
   a static bearing housing having a PDC static bearing surface formed thereon, the static bearing surface opposing the rotating bearing surface for supporting the rotational load on the rotating bearing surface, the static bearing housing having a bore formed therethrough,
   wherein the rotatable shaft passes through the bores of the static and rotatable bearing housings; and
   wherein the process fluid flows through the static bearing housing immersing the rotating and static bearing surfaces therein and through ports in the rotating bearing housing for directing the process fluid therethrough from the rotatable bearing housing bore.

11. The bearing assembly of claim 10 further comprising flow passages formed between the rotatable shaft and the static and rotating bearing housings for directing the process fluid through the bearing assembly.

12. The bearing assembly of claim 10 wherein the bearing assembly further comprises the rotatable shaft, the flow passages being formed along the shaft.

13. The bearing assembly of claim 10, wherein the bearing assembly further comprises the rotatable shaft, the flow passages being formed along the shaft, the flow passages comprising ports formed in the rotating bearing housing for passing fluids therethrough from the rotating bearing housing bore.

14. The bearing assembly of claim 10 wherein the rotating and static bearing surfaces further comprise:
   a plurality of polycrystalline diamond compact (PDC) inserts mounted therein.

15. The bearing assembly of claim 10, wherein the bearing assembly is a conical bearing assembly, angular-contact of the opposing rotating and static bearing surfaces being arranged circumferentially about an outside and an inside surface of a conical surface of a right circular cone.

16. The bearing assembly of claim 15 wherein a contact surface of each of the plurality of PDC inserts on the rotating bearing surface is profiled to avoid lip-to-lip contact with the opposing PDC inserts on the static bearing surface.

17. The bearing assembly of claim 10, wherein the bearing assembly is a spherical bearing assembly, angular-contact of the opposing rotating and static bearing surfaces being arranged circumferentially about an outside and an inside surface of a spherical surface.

18. The bearing assembly of claim 17 wherein a contact surface of each of the plurality of PDC inserts on the rotating bearing surface and the static bearing surface is profiled to avoid lip-to-lip contact therebetween.

* * * * *